May 3, 1927.

W. A. SMITH

METHOD OF PREPARING FOOD SUBSTANCES

Filed Jan. 15, 1925   5 Sheets-Sheet 1

1,627,466

Inventor
William A. Smith
Frederick F. Church
his Attorney

May 3, 1927. 1,627,466
W. A. SMITH
METHOD OF PREPARING FOOD SUBSTANCES
Filed Jan. 15, 1925 5 Sheets-Sheet 2
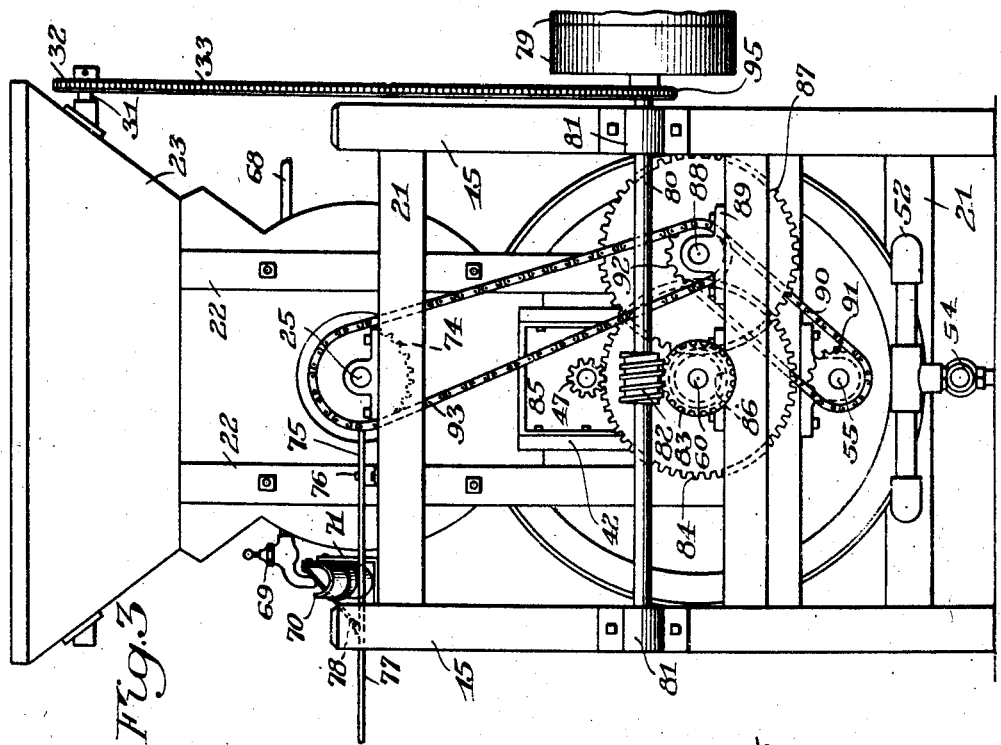
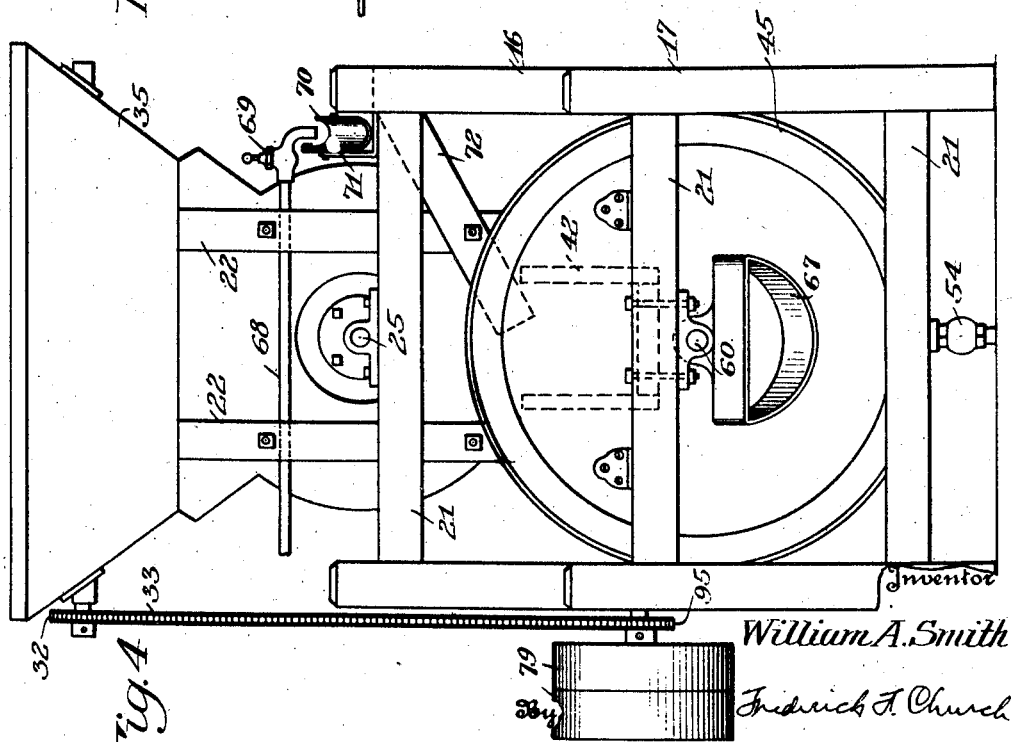
Inventor
William A. Smith
By Frederick F. Church
his Attorney

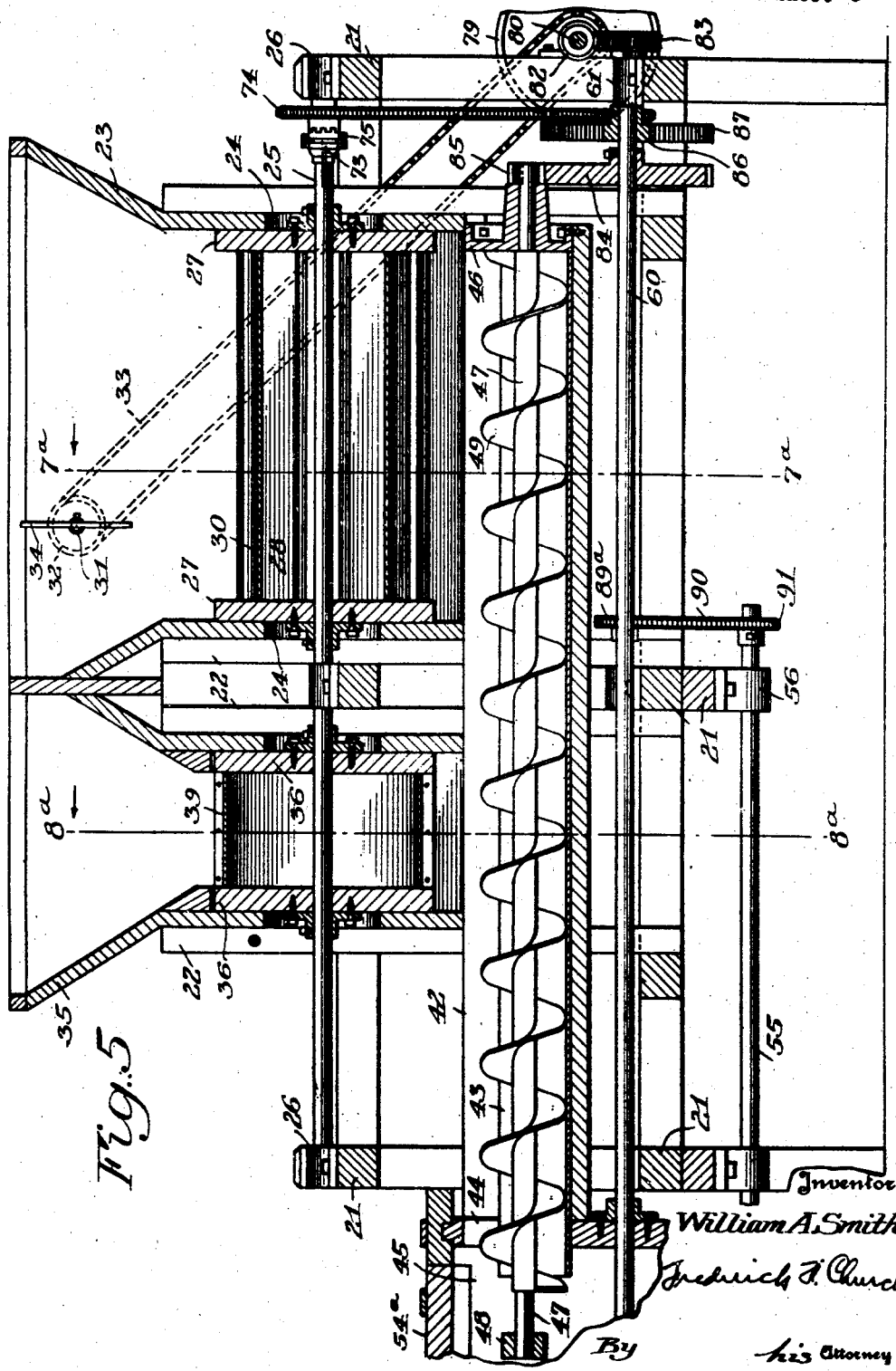

May 3, 1927.
W. A. SMITH
METHOD OF PREPARING FOOD SUBSTANCES
Filed Jan. 15, 1925     5 Sheets-Sheet 4
1,627,466
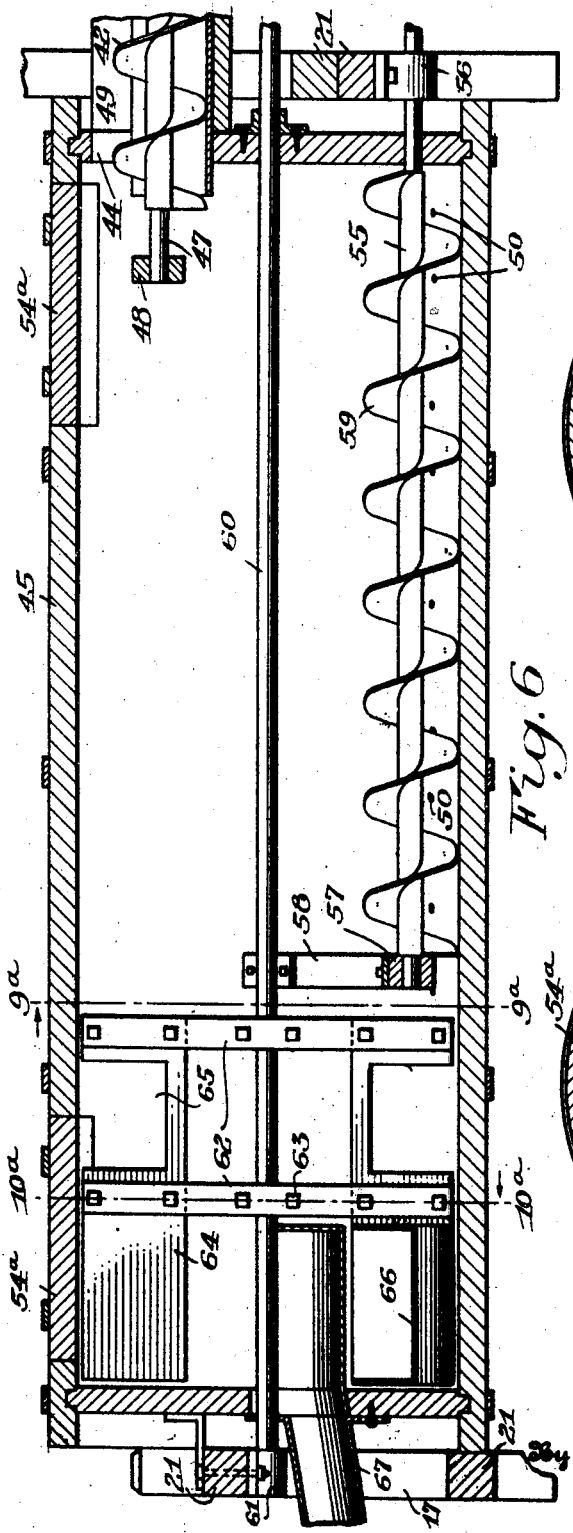
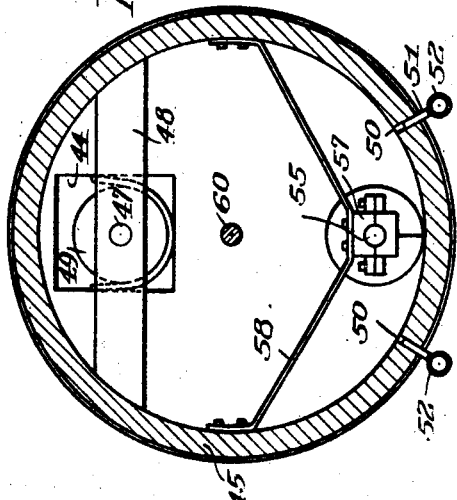
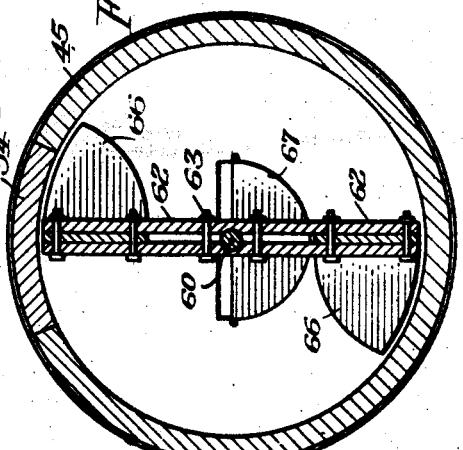
Inventor
William A. Smith
Frederick F. Church
his Attorney

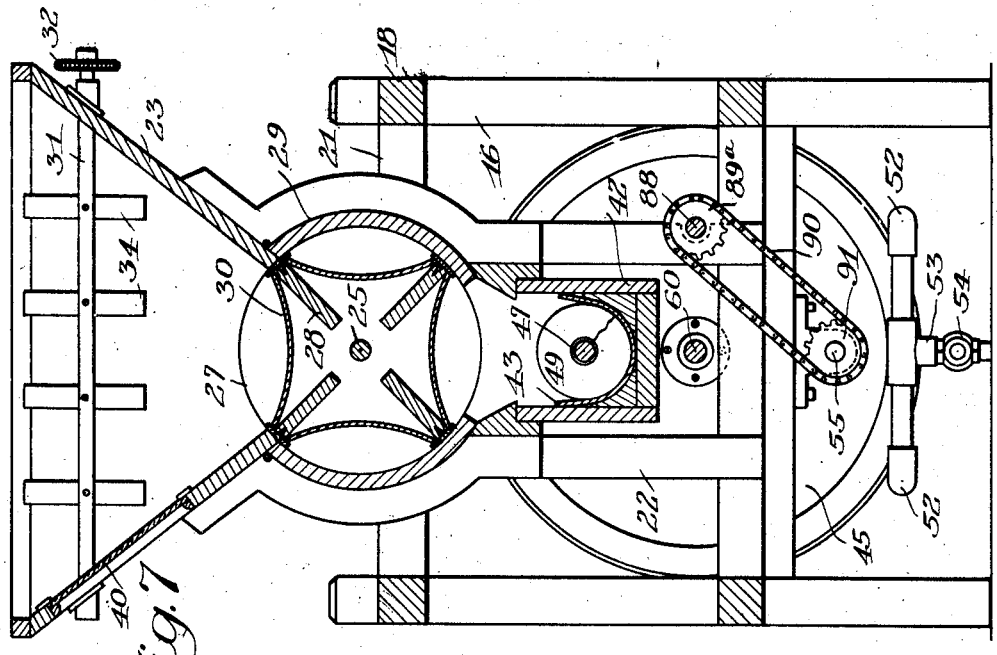
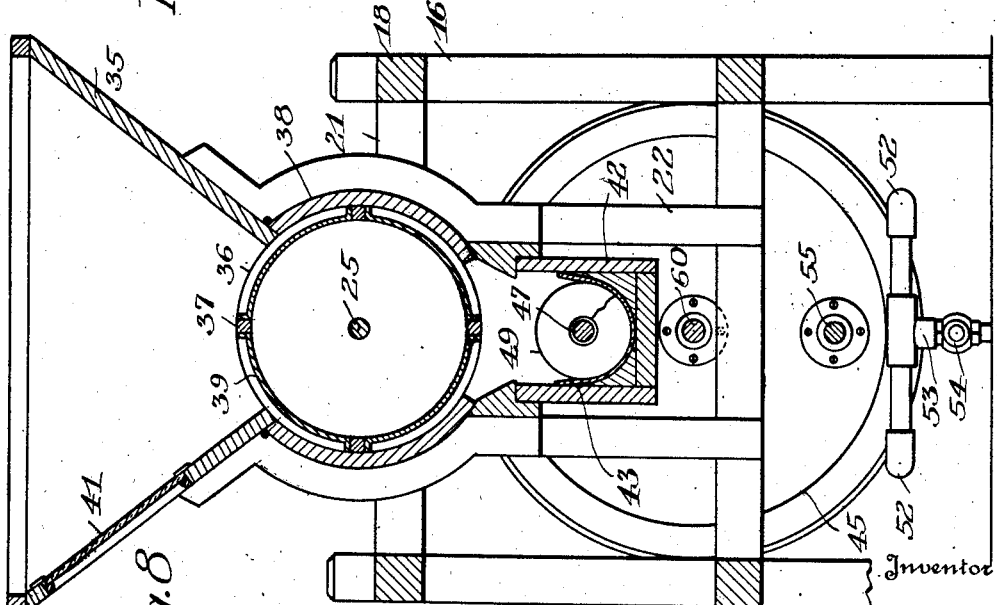

Patented May 3, 1927.

1,627,466

UNITED STATES PATENT OFFICE.

WILLIAM A. SMITH, OF CLARKSON, NEW YORK.

METHOD OF PREPARING FOOD SUBSTANCES. REISSUED

Application filed January 15, 1925. Serial No. 2,489.

This invention relates to methods of preparing food substances and, more particularly, such substances as require the mixture of several ingredients and the heating or cooking of the same, as, for example, fruit sauces, jams and the like, one object of the invention being to provide an advantageous method for making fruit products such, for example, as apple sauce, in an expeditious and economical manner capable of being controlled to yield uniform and pleasing characteristics of flavor, consistency, color and the like. Another object is to provide a simple and practical method of this character adapted to be carried out in a continuous manner, and to provide for the delivery of the cooked compound in uniform and pleasing quality ready for canning or other disposition.

To these and other ends the invention resides in certain improvements and combinations of parts, all as will be hereinafter more fully described, the novel features being pointed out in the claims at the end of the specification.

In the drawings:—

Figure 3 is a view in elevation of the front end of the machine;

Figure 4 is a similar view of the rear end.

Figure 5 is a longitudinal central vertical section of a portion of the machine showing primarily the ingredient-measuring and mixing devices;

Figure 6 is a similar view of another portion of the machine showing primarily the cooking and delivering devices;

Figures 7 and 8 are sectional views on the lines $7^a$—$7^a$ and $8^a$—$8^a$, respectively, of Figure 5;

Figures 9 and 10 are sectional views on lines $9^a$—$9^a$ and $10^a$—$10^a$ of Figure 6.

Similar reference characters throughout the several views indicate the same parts.

The invention is applied in the present instance to the manufacture of apple sauce, which has been commonly carried on heretofore by cutting up the apples and depositing the same with suitable quantities of sugar and water in a kettle, applying heat to the latter externally by a steam jacket or similar means and stirring the contents from time to time until cooked. Various serious difficulties have been encountered in this process. If the mixture of ingredients, or compound, be heated to an excessive degree or for too long a period of time it tends to become discolored, and depreciated in value as a commercial article, and when cooked in a kettle such injury frequently occurred at the sides or hottest portions of the kettle before the compound at the center of the latter was sufficiently cooked. If stirred to avoid this difficulty, the apple pulp tends to disintegrate and form a thick, heavy fluid or liquor which is more difficult to heat uniformly, boils at a higher temperature, resists the penetration of steam and therefore requires heating for a longer period, with greater likelihood of injury in the manner described. Furthermore, being a manual operation, requiring the use of a number of kettles for quantity production, it involved much labor of a disagreeable character resulting in frequent scalding of the operator, as well as the spilling and waste of considerable material.

It has been discovered that such injury of the product may be avoided, and the process accomplished rapidly and economically by combining the apple cuttings and sugar, preferably by mixing these ingredients thoroughly in a cold state to coat the apple pieces with a sugar film and then moving the mixture continuously and slowly, and without breaking up the apple pulp, through a plurality of jets of steam with means controlling the flow of the latter. The ingredients are thus brought into intimate and thorough contact with the steam and the condensation from the latter supplies, already heated, all or the greater portion of the water ingredient required. The pieces of pulp are all subjected to thorough heating in intimate contact with the sugar and moisture and uniformly cooked by a continuous and rapid process accurately controlled by regulation of the supply of steam.

The preferred apparatus for carrying out the above process comprises, generally speaking, an elongated container or channel to which the ingredients are supplied at one end by suitable measuring apparatus, the container being provided at another portion thereof with means for heating and cooking the ingredients. By means of propelling devices in the container the ingredients are first mixed and then advanced through the cooking portion and finally through a working or beating device to discharge means for delivering the completed product in a more or less continuous flow. These parts will be more fully understood from the following detailed description in connection with the drawings.

Figure 1:
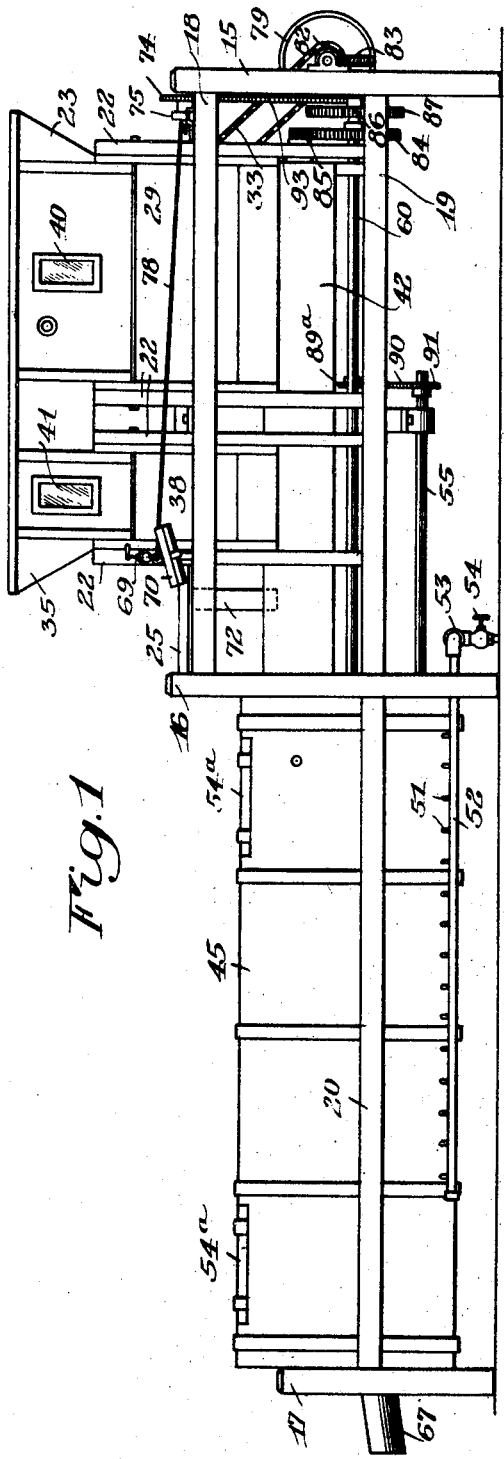
Figure 1 is a view in elevation of the front side of a machine for carrying out the present invention.
Figure 2:
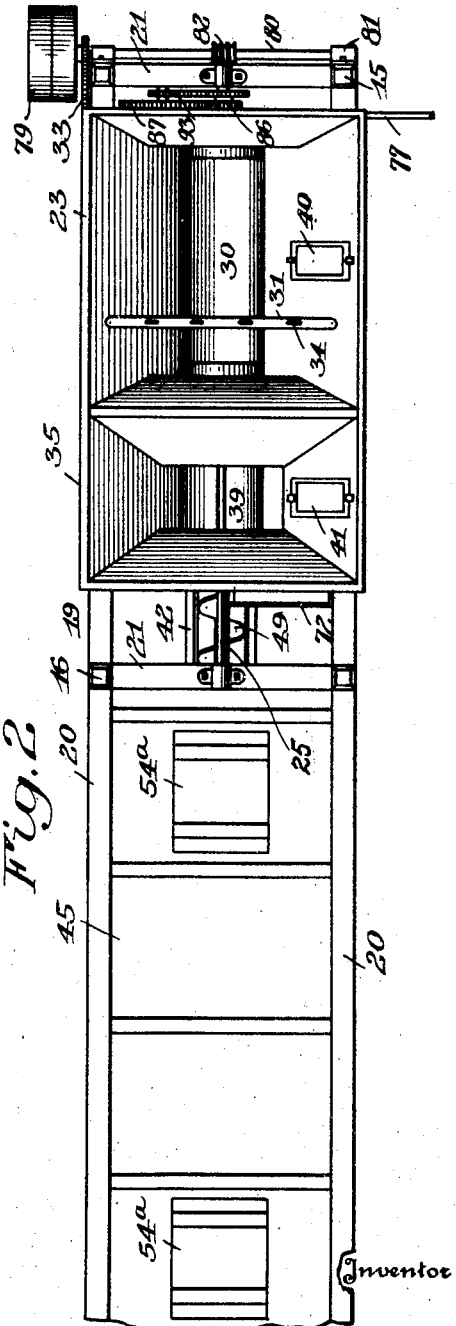
Figure 2 is a top plan view of the same partly broken away.

Referring first to Figures 1 and 2 there is shown a supporting frame including spaced pairs of posts 15, 16 and 17 connected by longitudinal beams 18, 19 and 20, and by a series of transverse beams 21. Supported by a plurality of standards 22 on this frame is a receiver or hopper 23 adapted to receive apples which have been pared, cored and cut up into pieces, preferably thin slices. As shown in Figure 7, the hopper has flaring sides and a reduced lower portion, the opposite ends of which are formed with openings 24 through which passes a rotary shaft 25 supported in bearings 26 on cross beams 21. Fixed on shaft 25 within the hopper, in spaced relation and in proximity with its ends so as to close the openings therein, are discs 27 connected by a plurality of radially extending partitions 28 the outer edges of which, as also the discs 27, fit closely within a circular enlargement 29 in the hopper. The adjacent partitions 28 are connected by plates 30 sprung into the concave arcuate form shown in Figure 7, thus forming what may be termed a measuring drum provided with pockets in which uniform quantities of apple cuttings are collected and carried around as the drum revolves. The measured quantities of apple or other ingredient thus separated are discharged through the bottom of the hopper which opens into a mixing container portion or channel described hereafter. It is apparent from the above construction that the measuring pockets may be varied in size and capacity depending upon the curvature of plates 30 as determined by the point of attachment of the latter to the partitions or by the width of the plates, and the elongated shape of the pocket circumferentially of the drum provides for the more or less gradual discharge of the contents thereof as the pocket passes the edge of the discharge opening in the hopper, so that the supply of the ingredient to the mixing channel is practically continuous.

To prevent the apples or other substance supplied by the hopper 23 from becoming jammed or clogged in the top of the latter there is provided a shaft 31, Figures 5 and 7, journaled in the sides of the pocket and having exteriorly of the latter a sprocket wheel 32 with which is engaged a chain 33 driven by suitable actuating means hereafter described. The shaft carries vanes or paddles 34 arranged to agitate the contents of the hopper to keep up the flow of the latter to the measuring apparatus or drum.

A second hopper 35, Figures 5 and 8, is provided adjacent the first and adapted in the present instances for supplying sugar to the mixing container. Shaft 25 is continued through this hopper also and has fixed thereon, as in hopper 23, discs 36 connected by cross bars 37 rotating in proximity with the inner surface of a circular enlargement 38 in the lower portion of the hopper. Bars 37 support circularly extending plates 39 slightly spaced from the walls of enlargement 38 so that as this measuring drum is revolved the depressions formed by plates 39 supply measured quantities of the ingredient through the bottom of the hopper which discharges into the mixing channel, and the elongated shape of these depressions also provides for a more or less constant flow of the ingredient. The hoppers are provided with windows 40 and 41 for inspection of the contents thereof.

The mixing channel comprises a substantially trough like member 42 having a semicircular bottom preferably lined with a sheet of metal 43. As already stated the channel extends from its forward end under hoppers 23 and 35 in succession and at its rear end passes through an opening 44 in a cooking container portion or chamber 45 described hereafter. At its forward end the channel is closed by a plate 46 provided with a bearing in which rotates a shaft 47 actuated by means presently described, the shaft being supported at its rear end by a bearing 48 in the cooking chamber. Carried on the shaft is a propeller 49, preferably of the screw or spiral type, for advancing the ingredients supplied from hopper 23 past hopper 35 from which sugar is more or less evenly distributed thereon, the propelling means serving to work and thoroughly mix the ingredients in a cold state so that each particle of pulp is coated with sugar and to discharge the same into the cooking chamber. A means is also provided as described below for supplying water to the ingredients in the mixing container when necessary at a point in rear of hopper 35.

The cooking chamber 45 is preferably in the form of a stationary drum with a plurality of spaced openings 50, Figures 6 and 9, in alignment with each other on opposite sides of the bottom thereof, with which openings communicate jet pipes 51 projecting from supply pipes 52 connected with a common feed pipe 53 leading to a source of steam supply. A valve 54 provides for the regulation of the supply of steam to vary the temperature in the chamber and accurately control the heating or cooking operation. Doors 54ª in the top of the drum afford easy access thereto for inspection and cleaning.

Adjacent the bottom of the chamber is a shaft 55 rotating in bearings 56 on the cross beams 21 and driven by the actuating means, the end of the shaft within the chamber being supported by a bearing 57 suspended from a bar or strap 58 fixed to the sides of the chamber. Shaft 55 carries a screw propeller 59 which serves to slowly advance the mixture received from the mixing channel past the steam jets, which, as shown in the drawing, extend through a considerable portion of the length of the chamber. The steam is injected upwardly through the mixture and tends to direct the same toward the propeller so that all portions of the mixture are subjected to intimate contact with and thorough cooking by the steam, as the propeller moves it toward the rear end of the chamber. The condensation from the steam supplies, already heated, all or a major portion of the water ingredient required, depending upon the amount of juice in the pulp. To assist the flow of the compound under the advancing action of the propelling means, the mixing channel and cooking chamber are preferably both slightly inclined downwardly longitudinally of the machine toward its rear end.

In order to work the compound after the latter has been cooked, to further mix the same and break up solid portions of pulp, there is preferably provided in the cooking chamber a shaft 60 supported at its ends in suitable bearings 61 on cross beams 21 and having fixed thereon, adjacent the rear end of the propeller, spaced pairs of arms 62 secured together by means of bolts 63 and thus clamped in fixed relation with the shaft. Carried by the outer ends of these pairs of arms are plates or boards 64 extending between the arms and beyond the latter adjacent the rear end of the chamber. The boards are preferably partially cut away between the arms as at 65 leaving vanes or paddles which serve to beat the compound as the latter is pushed rearwardly across their path. The product is thus automatically and thoroughly mixed and cooked, and beaten, in a comparatively rapid and continuous operation, which is controlled to produce the qualities desired by the adjustment of the relative proportions of the ingredients and by the degree of heat applied, resulting not only in a uniform product but one which obviates various undesirable characteristics frequently encountered such, for example, as imperfections in the flavor, discoloration, etc.

For discharging the compound from the cooking chamber there are provided on the rear ends of board 64 a pair of scoops 66, Figure 10, adapted to gather up the compound as it leaves the beaters and to elevate and discharge the same into a trough 67 having an end extending under the upper position of the scoops, and passing through an opening in the end of the chamber to a position convenient for delivery of the product for screening or other disposition.

The means for supplying additional water to the mixing chamber when required comprises preferably a pipe 68, Figures 1 and 4, carrying a controlling valve 69 adapted to discharge the water into an inclined trough 70 pivotally supported on a bracket 71 on a cross beam 21, the trough in the position shown in the drawings being arranged to discharge the water into a second trough 72 which discharges into the mixing trough in rear of hopper 35. The flow of water is regulated of course by adjustment of valve 69, and by swinging trough 70 about its pivot to inclination in the direction opposite to that shown the water is entirely diverted from trough 72 and the mixing channel into a waste receptacle (not shown.)

A means is provided for stopping and starting the operation of the ingredient measuring apparatus and of the supply of water, simultaneously, and independently of the operation of the rest of the mechanism, comprising a clutch part 73, Figure 5, splined on shaft 25 and cooperating with a similar clutch part on the hub of a sprocket 74 rotatable on the shaft and driven by chain connection with the actuating means. Clutch part 73 has a circumferential groove with which engages the forked end of a shipper lever 75 pivotally supported at 76 by a bracket on one of the cross beams 21, the lever extending beyond the frame to provide a handle 77 for operating the clutch to connect and disconnect the measuring apparatus of the hoppers with the actuating means. Pivotally connected with the shipping lever is a rod 78 the other end of which is connected with trough 70 for the purpose of inclining the latter either to discharge the water into trough 72 or into a waste receptacle. Both hoppers and the water supply are thus conveniently operated by a common lever.

The actuating means of the machine comprises tight and loose pulleys 79, where a belt drive is preferred, on a shaft 80 rotating in bearings 81 on posts 15, Figure 3, the shaft having fixed thereon a worm 82 meshing with a worm wheel 83 at the forward end of shaft 60 for driving the beaters and the discharge means or scoops. Fixed on shaft 60 is a gear 84 meshing with a pinion 85 fixed on shaft 47 for rotating the mixing propeller. Shaft 60 has fixed thereon also a pinion 86 meshing with a gear 87 fixed on a shaft 88 rotating in bearings 89 on cross beams 21. Fixed on shaft 88 adjacent the rear end of the latter is a sprocket 89$^a$, Figure 5, with which engages a sprocket chain 90 engaging also a sprocket 91 of shaft 55 for driving the propeller in the cooking chamber. Shaft 88 also carries a sprocket 92 with which engages a sprocket chain 93 passing over sprocket 74 on shaft 25 for actuating the measuring apparatus. Shaft 80 has fixed thereon adjacent pulleys 79 a sprocket 95 with which engages the sprocket chain 33 driving the agitator in hopper 23.

In operation with tight pulley 79 driven from a suitable source of power and the supply of water and steam heat adjusted, preferably with the measuring apparatus stationary and the water supply cut off, the desired ingredients are fed to hoppers 23 and 35, with the measuring drum of the former adjusted to supply the desired relative proportions. When a sufficient supply has been fed to the hoppers, the operation of the measuring apparatus is started and the water turned on by means of handle 77. The machine then automatically measures the ingredients and discharges the same to the mixing channel, the apple cuttings or other ingredients in hopper 23 passing in a substantially continuous flow under hopper 35, from which a practically continuous stream of sugar is fed, and past the auxiliary water supply, the propeller serving to mix the ingredients and discharge the same into the cooking chamber. The propelling means of the latter rotates slowly to advance the compound gently under the heating action of the steam, so that the product is evenly and thoroughly cooked at a temperature controlled by the adjustment of the steam valve. The product then passes the heating device where it is subjected to a working operation, and thence to the discharge means by which it is delivered ready for disposal. If at any time the quantity of material in a portion of the machine becomes excessive, or tends to clog, the measuring apparatus and the water supply may be temporarily stopped to relieve the difficulty and again started without stopping the rest of the apparatus. As apparent from the above explanation the invention provides a method for producing a fruit product of the class described in a simple, practical and continuous manner with a minimum of labor and expense and if desired in large quantities, by a sanitary process under full control of the operator at all times with the result that it provides for the manufacture of a very uniform product having the desired flavor, natural color and other pleasing qualities.

I claim as my invention:

1. A method of preparing apple sauce consisting in cutting up the apples, mixing the same with sugar in proper relative proportions to coat the apple pieces with a sugar film, and moving the compound in an unbeaten state through a flow of free steam to moisten and cook the same.

2. A method of preparing apple sauce consisting in cutting up the apples, combining the same with sugar in proper relative proportions, working the compound in a cold state to coat the apple pieces with a sugar film, and moving the compound through a plurality of jets of steam within a container to moisten and cook the same.

3. A method of preparing apple sauce consisting in cutting the apples into relatively thin slices, combining the same with sugar in proper relative proportions, working the compound in a cold state to coat the apple slices with a sugar film, and continuously moving the compound in an unbeaten state through a plurality of jets of steam in a path of sufficient length to moisten and cook the same.

WILLIAM A. SMITH.